(12) United States Patent
Molina et al.

(10) Patent No.: US 10,327,137 B2
(45) Date of Patent: Jun. 18, 2019

(54) SYSTEM AND METHOD FOR DETECTING MALICIOUS ATTACKS IN A TELECOMMUNICATION NETWORK

(71) Applicant: Mavenir Systems, Inc., Richardson, TX (US)

(72) Inventors: Carlos Molina, Plano, TX (US); Ravi Danda, Irving, TX (US); Dipankar Bhattacharyya, Plano, TX (US)

(73) Assignee: Mavenir Systems, Inc., Richardson, TX (US)

( * ) Notice: Subject to any disclaimer, the term of this patent is extended or adjusted under 35 U.S.C. 154(b) by 0 days.

(21) Appl. No.: 14/658,324

(22) Filed: Mar. 16, 2015

(65) Prior Publication Data
US 2016/0277926 A1 Sep. 22, 2016

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04W 12/06* | (2009.01) |
| *H04L 29/06* | (2006.01) |

(Continued)

(52) U.S. Cl.
CPC ......... *H04W 12/06* (2013.01); *H04L 63/1458* (2013.01); *H04W 12/12* (2013.01); *H04L 63/0876* (2013.01); *H04L 63/101* (2013.01); *H04L 63/102* (2013.01); *H04W 12/08* (2013.01)

(58) Field of Classification Search
CPC ..... H04W 72/04; H04W 48/04; H04W 24/02; H04W 16/14; H04B 7/14; G06F 11/00

USPC .................................................. 455/411, 410
See application file for complete search history.

(56) References Cited

U.S. PATENT DOCUMENTS

| | | | |
|---|---|---|---|
| 8,726,376 B2 * | 5/2014 | Rieschick | H04L 63/1441 705/52 |
| 8,774,824 B1 | 7/2014 | Mohan et al. | |

(Continued)

FOREIGN PATENT DOCUMENTS

KR    WO2014069954 A1    5/2014

OTHER PUBLICATIONS

LTE and Beyond, LTE attach procedure, Tech-blog on 4G/LTE and beyond, http://www.lteandbeyond.com/2012/01/lte-attach-procedure.html (Jan. 28, 2012).

(Continued)

*Primary Examiner* — Gary Lafontant
(74) *Attorney, Agent, or Firm* — Ohlandt, Greeley, Ruggiero & Perle, L.L.P.

(57) ABSTRACT

The solution introduces a method and system in a network node of a telecommunication network such as the MME. The method includes receiving, from an eNodeB, an attach request that originated from a UE, the attach request including an identifier associated with a subscriber of the UE; checking a UE blacklist to determine whether the identifier in the attach request is on the UE blacklist; in response to the UE identifier being on the UE blacklist: rejecting the attach request; updating a success rate metric to reflect the failed attach request; comparing the success rate metric to a threshold; and in response to a decrease in the success rate metric below the threshold, recognizing a malicious attack and taking mitigating steps.

35 Claims, 10 Drawing Sheets

(51) Int. Cl.
*H04W 12/12* (2009.01)
*H04W 12/08* (2009.01)

(56) References Cited

U.S. PATENT DOCUMENTS

| | | | | |
|---|---|---|---|---|
| 2009/0170426 | A1* | 7/2009 | Jung | H04W 8/24 |
| | | | | 455/7 |
| 2012/0026961 | A1* | 2/2012 | Pittmann | H04W 28/16 |
| | | | | 370/329 |
| 2012/0250658 | A1 | 10/2012 | Eisl et al. | |
| 2012/0258740 | A1* | 10/2012 | Mildh | H04L 63/107 |
| | | | | 455/456.4 |
| 2013/0136096 | A1* | 5/2013 | Lee | H04W 8/04 |
| | | | | 370/329 |
| 2013/0288676 | A1 | 10/2013 | Parsons et al. | |
| 2014/0165149 | A1* | 6/2014 | Chen | H04L 63/101 |
| | | | | 726/4 |
| 2014/0235262 | A1* | 8/2014 | Cho | H04W 28/0247 |
| | | | | 455/453 |
| 2015/0016289 | A1* | 1/2015 | Yun | H04W 24/02 |
| | | | | 370/252 |
| 2015/0036509 | A1* | 2/2015 | Lopes | H04W 16/10 |
| | | | | 370/241.1 |
| 2015/0327073 | A1* | 11/2015 | Rommer | H04L 63/0876 |
| | | | | 455/410 |

OTHER PUBLICATIONS eventhelix.com, LTE Attach and Default Bearer Setup Messaging, pp. 1-14, (2012).
3GPP; Technical Specification Group Services and System Aspects; GPRS enhancements for E-UTRAN access; Dec. 2014; 310 pp, XP050961085; (Release 13); 3GPP; Valbonne, FR.
European Examination Report dated Aug. 10, 2017 from corresponding EP Application No. 16160225.5, 5 pages.
European Office Action dated Jan. 31, 2019 from corresponding EP Application No. 16160225.5, 4 pages.

* cited by examiner

SYSTEM AND METHOD FOR DETECTING MALICIOUS ATTACKS IN A TELECOMMUNICATION NETWORK

FIELD

The present disclosure relates to a telecommunications system, and more particularly to a system and method for detecting malicious attacks in a telecommunication network.

BACKGROUND

The Third Generation Partnership Project (3GPP) unites six telecommunications standards bodies, known as "Organizational Partners," and provides their members with a stable environment to produce the highly successful Reports and Specifications that define 3GPP technologies. A mobile device, also called a User Equipment (UE), may operate in a wireless communication network that provides high-speed data and/or voice communications. The wireless communication networks may implement circuit-switched (CS) and/or packet-switched (PS) communication protocols to provide various services. For example, the UE may operate in accordance with one or more radio technology such as Universal Terrestrial Radio Access (UTRA), Evolved UTRA (E-UTRA), and Global System for Mobile Communications (GSM) as part of an Universal Mobile Telecommunication System (UMTS). UTRA, E-UTRA, GSM, UMTS and LTE (Long Term Evolution) are described in specification documents from 3GPP. These various radio technologies and standards are known in the art.

The Evolved Packet Core (EPC) is the latest evolution of the 3GPP core network architecture first introduced in Release 8 of the standard. In EPC, the user data and the signaling data are separated into the user plane and the control plane. The EPC is composed of four basic network elements: the Serving Gateway (SGW), the Packet Data Network Gateway (PDN GW or PGW), the Mobility Management Entity (MME), and the Home Subscriber Server (HSS). The EPC is connected to external networks, which can include the IP Multimedia Core Network Subsystem (IMS).

Due to the architecture of the LTE, the MME is exposed to all signaling generated in the access networks. These signaling demands may overload the capacity limits of the MME, especially in the event of malicious attacks, such as Denial of Service (DOS) attacks. Signaling overload may cause delays, packet loss, or even service outages.

DETAILED DESCRIPTION

Figure 1:
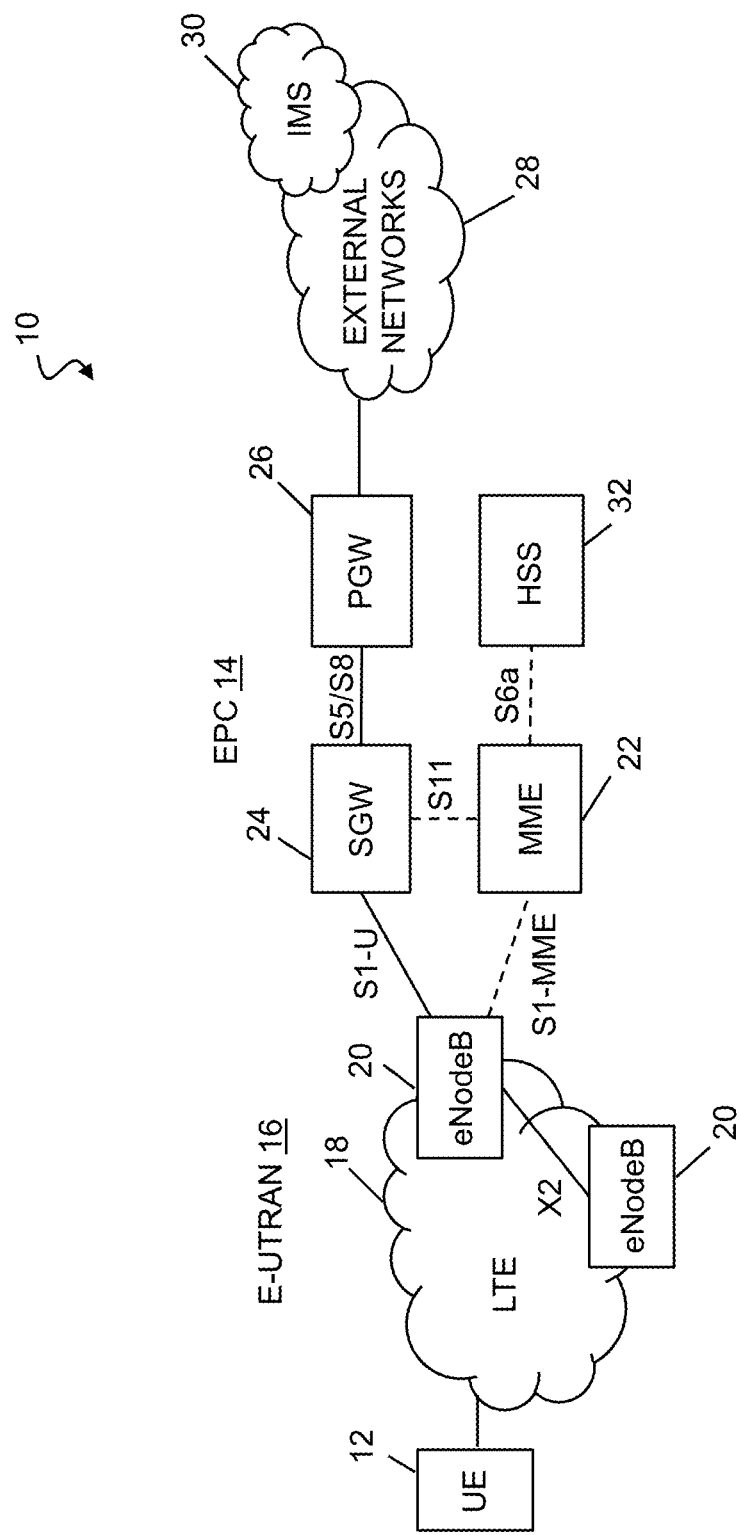
FIG. 1 is a simplified block diagram of an exemplary Evolved Packet System (EPS) network architecture according to the present disclosure.

FIG. 1 is a simplified diagram illustrating an Evolved Packet System (EPS) 10. The EPS 10 may include one or more user equipment (UE) 12 accessing the Evolved Packet Core (EPC) 14 over an Evolved UMTS Terrestrial Radio Access Network (E-UTRAN) 16, an access network in LTE (Long Term Evolution) 18. The E-UTRAN 16 includes at least one evolved Node B or eNodeB (eNB) transceiver 20. The eNB 20 provides user plane and control plane protocol termination toward the UE 12. The eNB 20 may be connected to one or more other eNBs via a backhaul (e.g., X2 interface).

The eNB 20 is also commonly referred to as a base station, a base transceiver station, a radio base station, a radio transceiver, a transceiver function, a basic service set (BSS), and an extended service set (ESS). The eNB 20 provides an access point to the EPC 14 for a UE 12. Examples of an UE 12 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a monitoring device for machine-to-machine communication, or any other similar functioning device. The UE 12 is a 2G/3G/4G or CDMA-capable device. The UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 20 is connected by an S1 interface to the EPC 14, an S1-MME interface for control plane traffic to the Mobility Management Entity (MME) 22, and an S1-U interface for user plane traffic to the Serving Gateway (SGW) 24. The S1 traffic may use IPSec (IP Security) as the encryption mechanism. The EPC 14 may further include other MMEs, a Packet Data Network or PDN Gateway (PGW) 26, and a Home Subscriber Server (HSS) 32. The MME 22 is a key node in the control plane that processes signaling related to mobility and security between the UE 12 and the EPC 14. It is involved in the bearer activation/deactivation process and is also responsible for choosing the SGW 24 for a UE at the initial attach and at time of intra-LTE handover involving Core Network (CN) node relocation. It is also responsible for authenticating the user by interacting with the HSS 32. Generally, the MME 22 is configured to manage mobile context, session context, and security information of the UE 12. The MME checks the UE state with Equipment Identity Register (EIR) using the S13 interface. The MME 22 is further responsible for UE tracking and paging procedures.

In a preferred embodiment described herein, the MME 22 stores and maintains a "blacklist" of identifiers of UEs that have previously repeatedly failed authentication, are known stolen UEs, or are known to be associated with past malicious activities. The MME 22 is configured to check this blacklist upon receiving attach requests from UEs. The MME 22 is also configured to maintain a global eNB blocked list that contain unique identifiers of eNBs that are blocked due to past validation issues associated with S1 setup.

The gateway nodes 24 and 26 are in the user plane and transport IP data traffic between the UE 12 and the external networks 28. All user IP packets are transferred through the SGW 24 and the PGW 26. The SGW 24 is the connection point between the radio-side and the EPC 14, and routes and forwards user IP data packets while also acting as the mobility anchor for the user plane during inter-eNB handovers. For UEs in the idle state, the SGW 24 terminates the down link data path and triggers paging when down link data arrives for the UE. The SGW 24 and PGW 26 may communicate via an S5 or S8 interface.

The PGW 26 is the connection point between the EPC 14 and the external networks 28, and provides IP address allocation as well as other functions for the UE 12. The PGW 26 is connected to an operator's external IP networks 28 that may include, for example, the Internet, the Intranet, an IP Multimedia Subsystem (IMS) 30, and a PS Streaming Service (PSS). A UE 12 may have simultaneous connectivity with more than one PGW for accessing multiple Packet Data Networks. The PGW 26 further performs additional functions such as policy enforcement, packet filtering for each user, charging support, lawful interception, and packet screening.

The HSS 32 is primarily a database that contains user-related and subscriber-related information. It also provides support functions in mobility management, call and session setup, user authentication, and access authorization. The MME 22 communicates with the HSS via an S6a interface.

The concept described herein is generally a two-step process to validate and authenticate first the eNB and then the UE. The method makes use of a global eNB blocked list, a UE blacklist, and operational Key Performance Indicator (KPI) to recognize a malicious attack and respond with mitigating actions.

Figure 2:
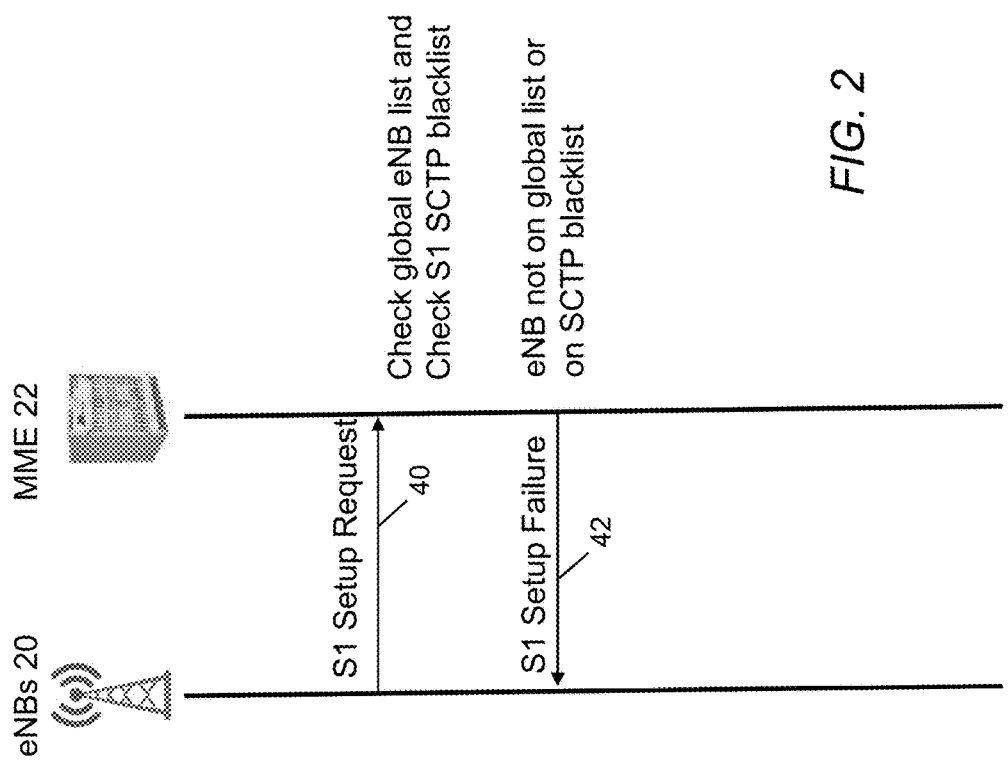
FIG. 2 is a simplified data flow diagram of an exemplary process for initial eNB setup according to the present disclosure.

FIG. 2 is a simplified data flow diagram of an exemplary process for initial eNB setup according to the present disclosure. The eNB first takes initiative to activate the S1-MME interface by transmitting the message S1 Setup Request message (40). The purpose of the S1 Setup procedure is to exchange application level data needed for the eNB and MME to interoperate correctly on the S1 interface. Stream Control Transmission Protocol (SCTP) is supported as the transport layer protocol of S1-MME signaling bearer between the eNB 20 and the MME 22. The S1 Setup Request message contains the unique identifier of the eNB 20 (Global eNB ID). The MME 22 may performs eNB validation by checking or consulting with a global list of pre-provisioned global eNB identifiers. The MME may also check the eNB identifier with an eNB blacklist, which maintains a list of identifiers associated with eNBs associated with faulty attach requests or malicious attacks in the past. If the current eNB is not on the global list or is on the eNB blacklist, then the MME 22 sends an S1 Setup Failure message back to the eNB 20 (42). The S1 Setup Failure message includes a Time to Wait Information Element (IE) that indicates a minimum amount of time that the same eNB must wait before reinitiating the S1 setup towards the same MME. The Time to Wait may be configured by the network operator. However, if the current eNB is found on the global list of pre-provisioned eNB, and it is not on the eNB blacklist, then the SCTP connection is accepted and the MME sends to the eNB an S1 Setup Response message. Details of the S1 setup process is available by consulting the 3 GPP TS 36.413 Technical Specification Group Radio Access Network; E-UTRAN; S1 Application Protocol (S1AP) document, incorporated herein by reference.

Figure 3:
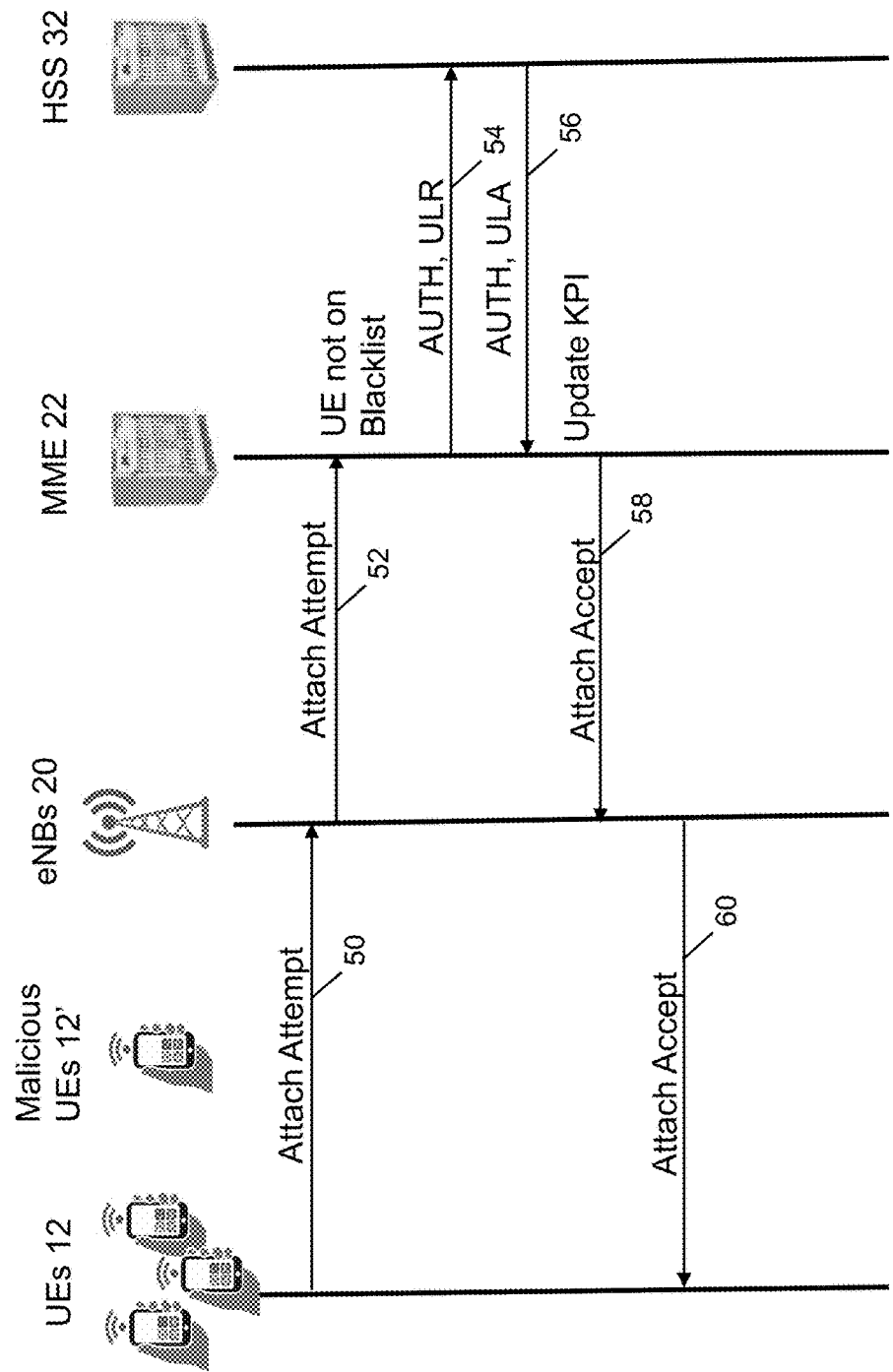
FIG. 3 is a simplified block diagram of an exemplary 3GPP network architecture with multiple radio access technologies according to the present disclosure.

FIG. 3 is a simplified data flow diagram of an exemplary normal attach request processing according to the present disclosure. It should be noted that some details and steps in the process have been simplified or omitted for the sake of brevity and clarity. In the LTE, UEs need to register with the network to receive some services. This registration process is called Network Attachment. The always on IP connectivity for the UE is enabled by establishing a default Evolved Packet Subsystem (EPS) bearer during the Network Attachment Procedure. The UE sends an Attach Request message to the eNB 20 (50). The Attach Request message includes a unique identifier that is associated with the user/subscriber of the UE, such as the International Mobile Subscriber Identity (IMSI), or old Globally Unique Temporary Identifier (GUTI). The Attach Request message may also include the Selected Network and the old Globally Unique Mobility Management Entity Identifier (GUMMEI). If available, the last visited Tracking Area Indicator (TAI) is also included. Details of the S1-MME interface between the eNB and MME is available by consulting 3GPP TS 23.401 Technical Specification Group Services and System Aspects General Packet Radio Service (GPRS) Enhancements for Evolved Universal Terrestrial Radio Access Network (E-UTRAN) Access document, incorporated herein by reference.

The eNB 20 derives the MME from the GUMMEI and the indicated Selected Network, and passes the Attach Request message to the MME 22 (52). Upon receiving the Attach Request message, the MME 22 checks a UE Blacklist to determine if the UE identifier has previously repeatedly failed authentication, is a known stolen UE, or is known to be associated with past malicious activities. If the UE is absent from the UE Blacklist, the MME sends the HSS 32 an Authentication and Update Location Request (ULR) message over the S6a interface for authentication (integrity protection) and to inform the HSS 32 about the identity of the user and update the HSS about the UE location and subscription information (54). The HSS 32 checks its database(s) whether the IMSI received from the MME 22 is known. If no error results, the HSS 32 sends back an Update Location Ack (ULA) message back to the MME (56) to acknowledge the update location message. The MME 22 updates a Key Performance Indicator (KPI) with the successful result of the current attach request then sends an Attach Accept message back to the eNB 20 (58), which conveys this message to the UE 12 (60). This KPI describes the ratio of the number of successfully performed attach procedures to the number of attempted attach procedures on a per eNB basis. Details regarding the S6a interface between the MME and HSS is available by consulting 3GPP TS 29.272 Technical Specification Group Core Network and Terminals; Evolved Packet System (DPS); Mobility Management Entity (MME) and Serving GPRS Support Node (SGSN) related interfaces based on Diameter Protocol, incorporated herein by reference.

Figure 9A:
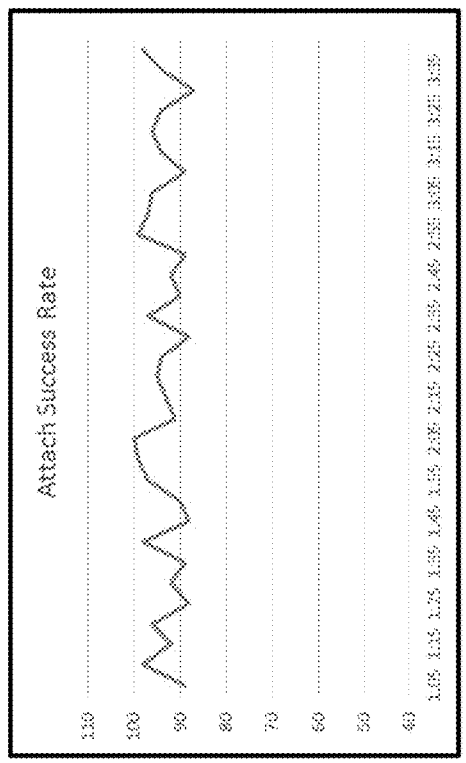
FIGS. 9A and 9B are exemplary charts of Key Performance Indicator used to identify threats according to the present disclosure.
Figure 9B:
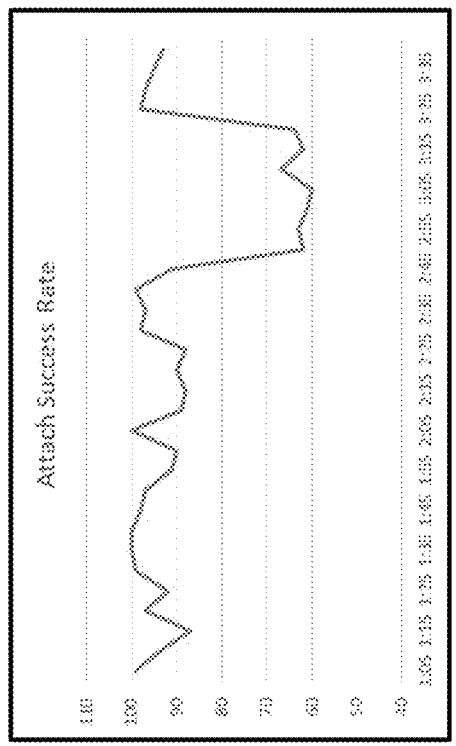

In particular, the MME keeps track of the KPI of the attach success rate on a per eNB basis to detect abnormalities in the operations. For example referring to FIGS. 9A and 9B, if the typical or normal attach success rate of a particular eNB has been in the 87% to 100% range, and then the success rate suddenly drops to 60% to 67%, the MME recognizes that an abnormal condition may be occurring and alerts Operations, Administration and Management (OAM) so that further analysis may be performed to determine if the higher failure rate is due to a malicious act such as a Denial of Service attack or a wide spread outage. The comparison of the success rate may be to a predetermined threshold or where the drop (change in success rate) is above a predetermined delta.

Figure 4:
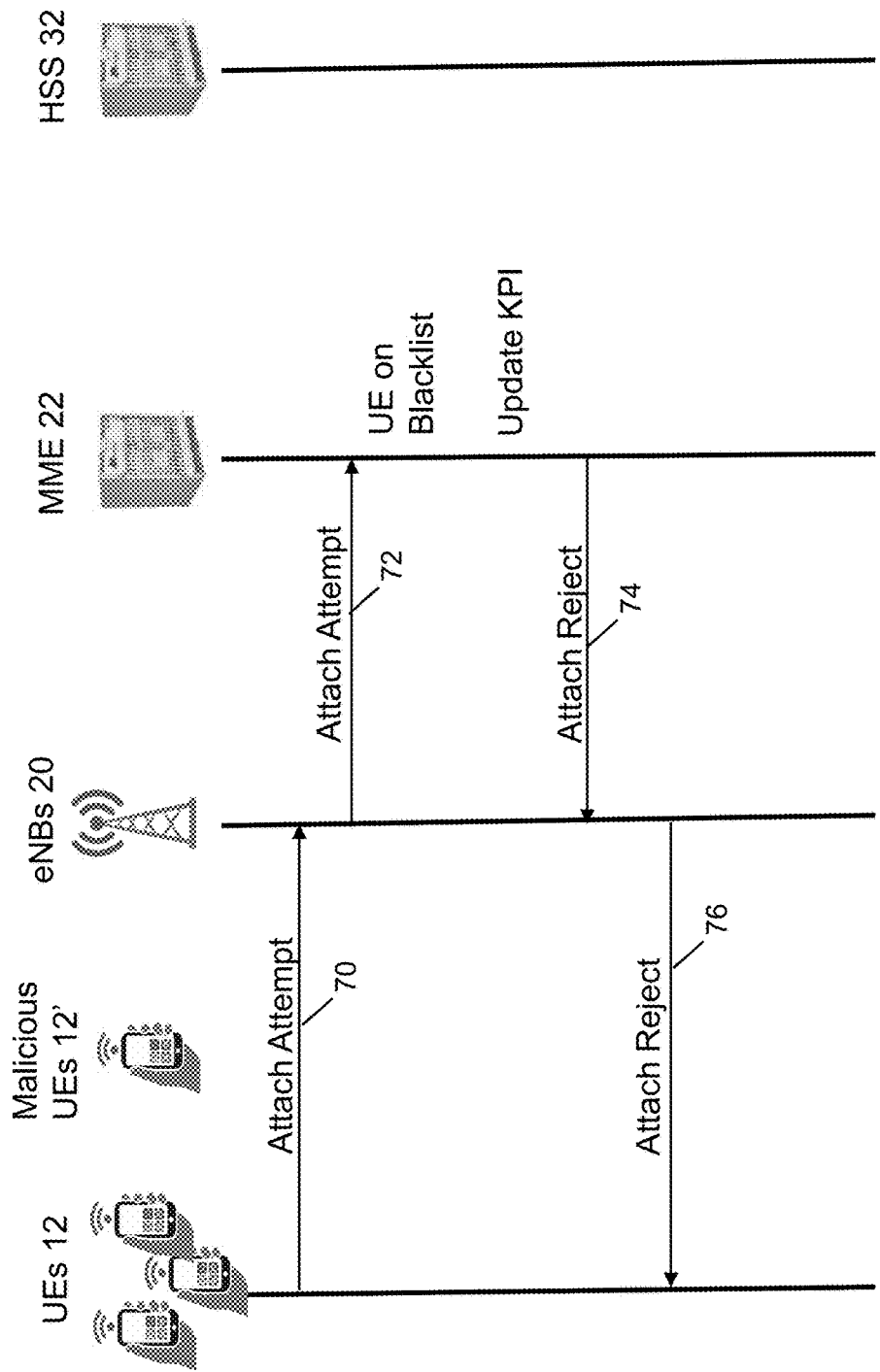
FIG. 4 is a simplified data flow diagram of an exemplary invalid attach request processing according to the present disclosure.

FIG. 4 is a simplified data flow diagram of an exemplary invalid attach request processing according to the present disclosure. It should be noted that some details and steps in the process have been simplified or omitted for the sake of brevity and clarity. As before, the UE sends an Attach Request message to the eNB 20 (70). The Attach Request message includes a unique identifier that is associated with the user of the UE. The eNB 20 passes the Attach Request message to the MME 22 (72). Upon receiving the Attach Request message, the MME 22 checks the UE Blacklist to determine if the UE identifier has previously failed authentication, is a known stolen UE, or is known to be associated with past malicious activities. If the UE is found to be on the UE Blacklist, the MME terminates the process without notifying the HSS 32. The MME 22 proceeds to update the KPI with results of the current attach request then sends an Attach Reject message back to the eNB 20 (74), which further conveys this message to the UE 12 (76).

Figure 5:
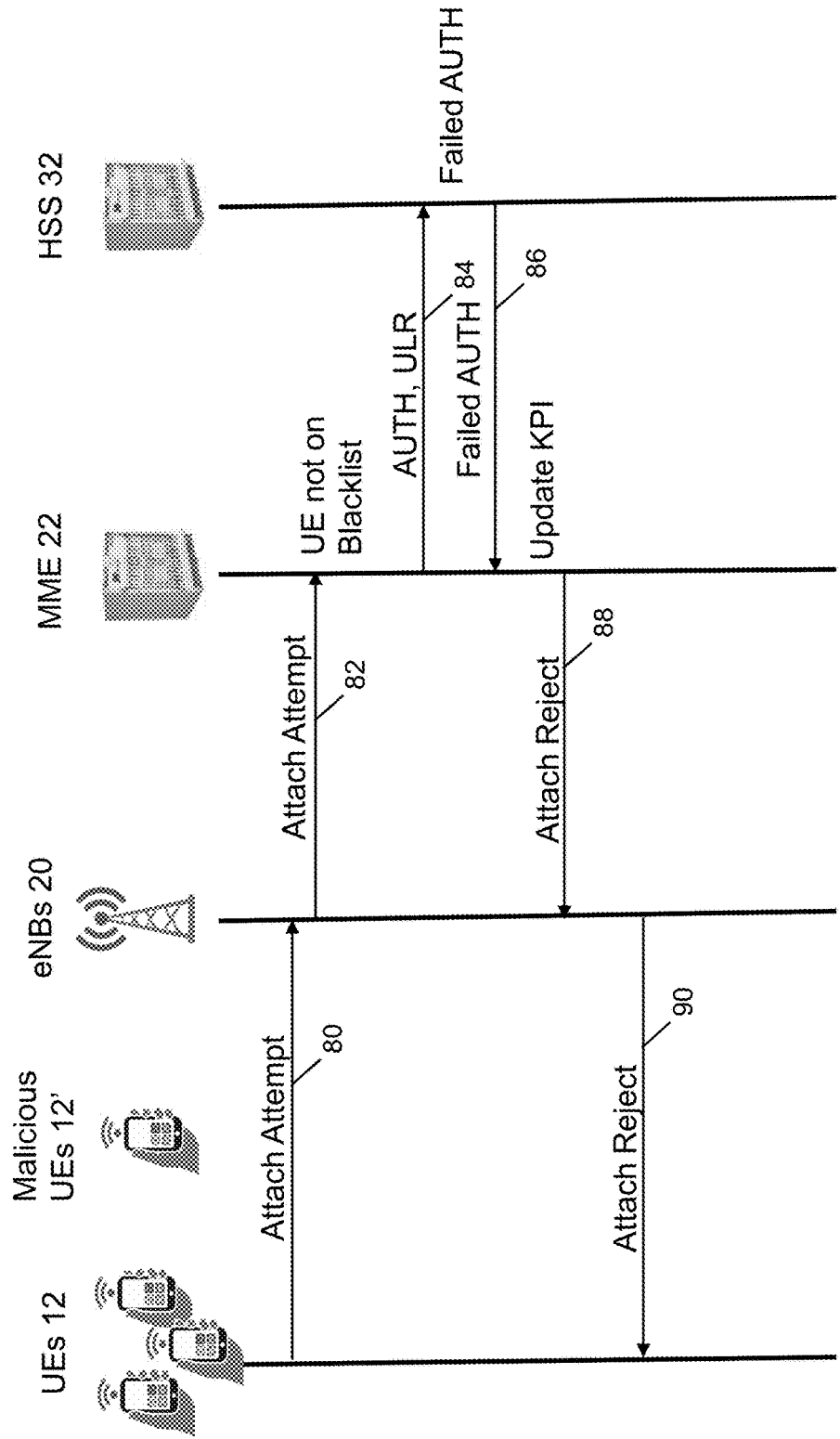
FIG. 5 is a simplified data flow diagram of an exemplary invalid attach request process according to the present disclosure.

FIG. 5 is a simplified data flow diagram of another exemplary invalid attach request process according to the present disclosure. It should be noted that some details and steps in the process have been simplified or omitted for the sake of brevity and clarity. The UE sends an Attach Request message to the eNB 20 (80). The eNB 20 then sends the Attach Request message to the MME 22 (82). Upon receiving the Attach Request message, the MME 22 checks a UE Blacklist to determine if the UE identifier has previously repeatedly failed authentication, is a known stolen UE, or is known to be associated with past malicious activities. If the UE is absent from the UE Blacklist, the MME sends the HSS 32 an Authentication and/or ULR message over the S6a interface to inform the HSS 32 about the identity of the user and update the HSS about the UE location and subscription information (84). The HSS 32 checks its database(s) whether the IMSI received from the MME 22 is known. If the HSS 32 uncovers an authentication error such as the IMSI is invalid, the HSS 32 sends back an authentication fail message back to the MME to indicate that an error resulted from authentication efforts (86). The MME 22 then determines and updates the Key Performance Indicator (KPI) with failure results of the current attach request and verifies whether the current attach success rate is above a certain threshold. The threshold may be set by the network operator and it can be an absolute value or a value relative to a "normal" success rate. For example, the threshold may be set at 65% success rate (below which an abnormal condition is recognized), or the threshold may be set at 20% or more below a "normal" success rate of 88% that has been held steadily at this value for a specified period of time. In other words, the threshold of comparison may be an absolute minimum value or a relative value or delta. The MME 22 then sends an Attach Reject message back to the eNB 20 (88), which conveys this message to the UE 12 (90).

Figure 6:
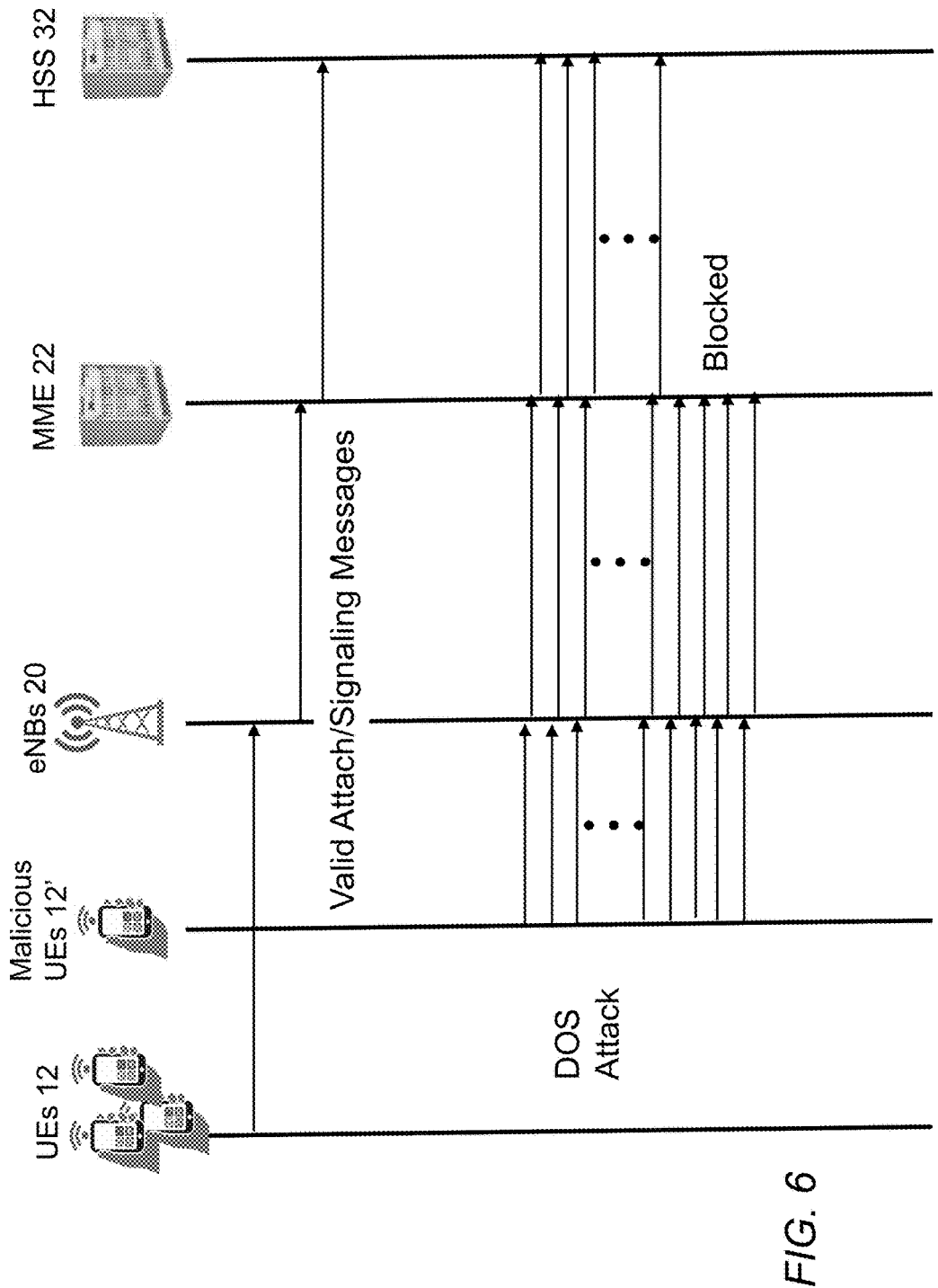
FIG. 6 is a simplified data flow diagram of an exemplary Denial of Service (DOS) attack detection and mitigation according to the present disclosure.

FIG. 6 is a simplified data flow diagram of an exemplary Denial of Service (DOS) attack detection and mitigation according to the present disclosure. It should be noted that some details and steps in the process have been simplified or omitted for the sake of brevity and clarity. In this example, a Denial of Service attack is launched from one or more malicious UEs 12'. The malicious UEs send the attach request messages to the eNB 20, which passes them on to the MME 22. Since initially the MME does not find the UE identifiers on the blacklist, the MME sends authentication requests to the HSS 32. However, at the HSS, authentication fails, and the HSS sends back messages to indicate authentication errors associated with these requests. The MME updates the KPI to take into account of the failed authentication result.

The MME keeps track of the number of times that the same UE failed the attach process. If the number of attach failure exceeds a threshold (set by the network operator), then the MME 22 adds the UE identifier to the blacklist. At some point the MME recognizes that the KPI success rate has fallen precipitously below a threshold (set by the network operator), and the MME raises an alarm. Additional attach requests from the same UE are thus blocked at the MME 22. Further, the identifier associated with the eNB is added to the eNB blacklist.

Figure 7:
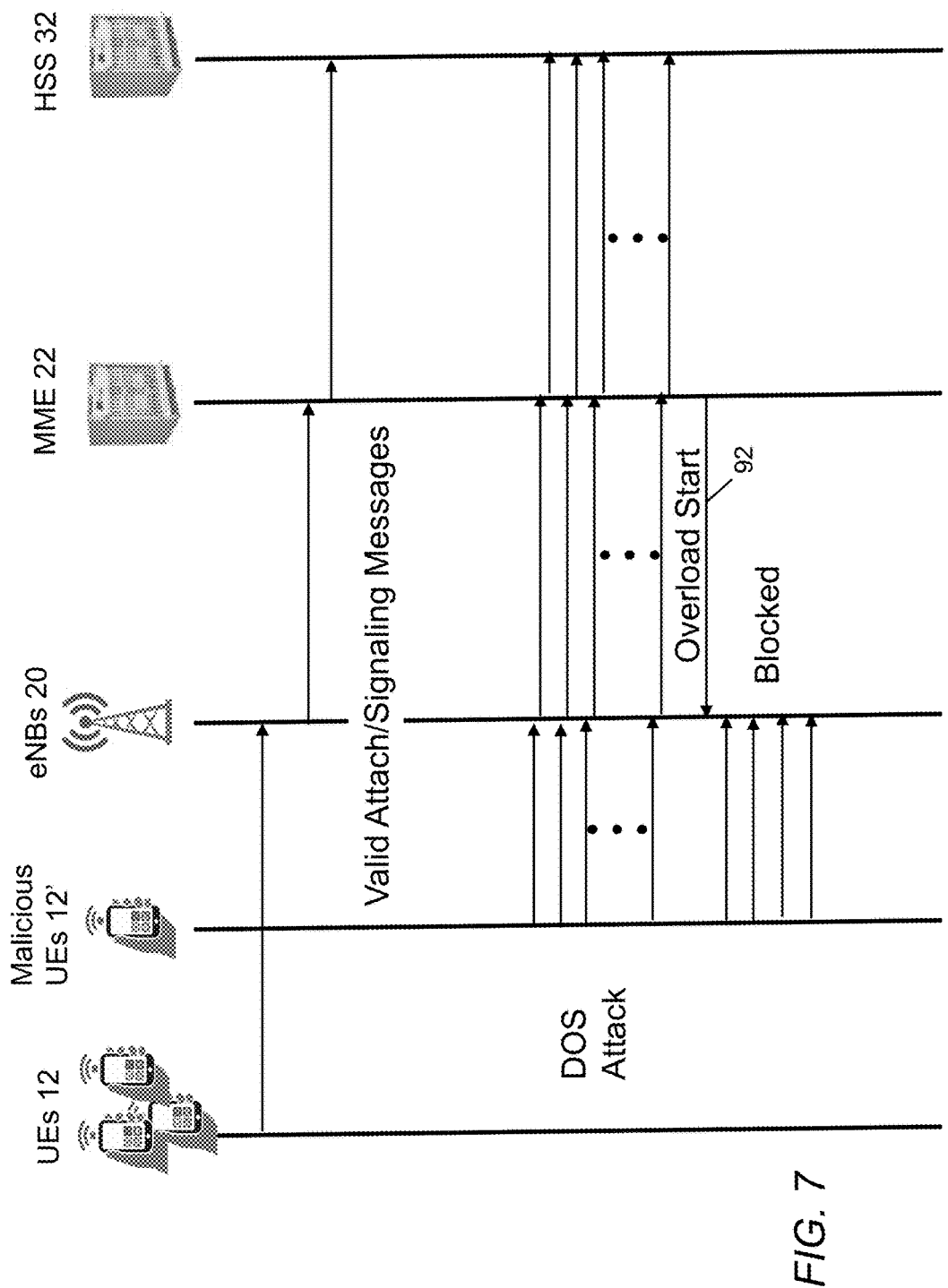
FIG. 7 is a simplified data flow diagram of another exemplary Denial of Service (DOS) attack detection and mitigation according to the present disclosure.

FIG. 7 is a simplified data flow diagram of another exemplary Denial of Service (DOS) attack detection and mitigation according to the present disclosure. It should be noted that some details and steps in the process have been simplified or omitted for the sake of brevity and clarity. In this example, a Denial of Service attack is launched from one or more malicious UEs 12'. The malicious UEs send the attach request messages to the eNB 20, which passes them on to the MME 22. Since initially the MME does not find the UE identifiers on the blacklist, the MME sends authentication requests to the HSS 32. However, at the HSS, authentication fails, and the HSS sends back messages to indicate authentication errors associated with these requests. The MME 22 adds the UE identifiers to the blacklist and updates the KPI with the failed authentication results. At some point the MME 22 recognizes that the KPI success rate has now below a threshold (predetermined or set by the network operator). As a result, the MME raises an alarm and sends an Overload Start message to the source eNB 20 (92). In response to receiving the Overload Start message, the eNB blocks all future non-emergency attach requests. Further, the identifier associated with the eNB is added to the eNB blacklist. Once the Denial of Service attack is resolved, the MME 22 may send an Overload Stop message to the eNB to restore it to normal operations.

Figure 8:
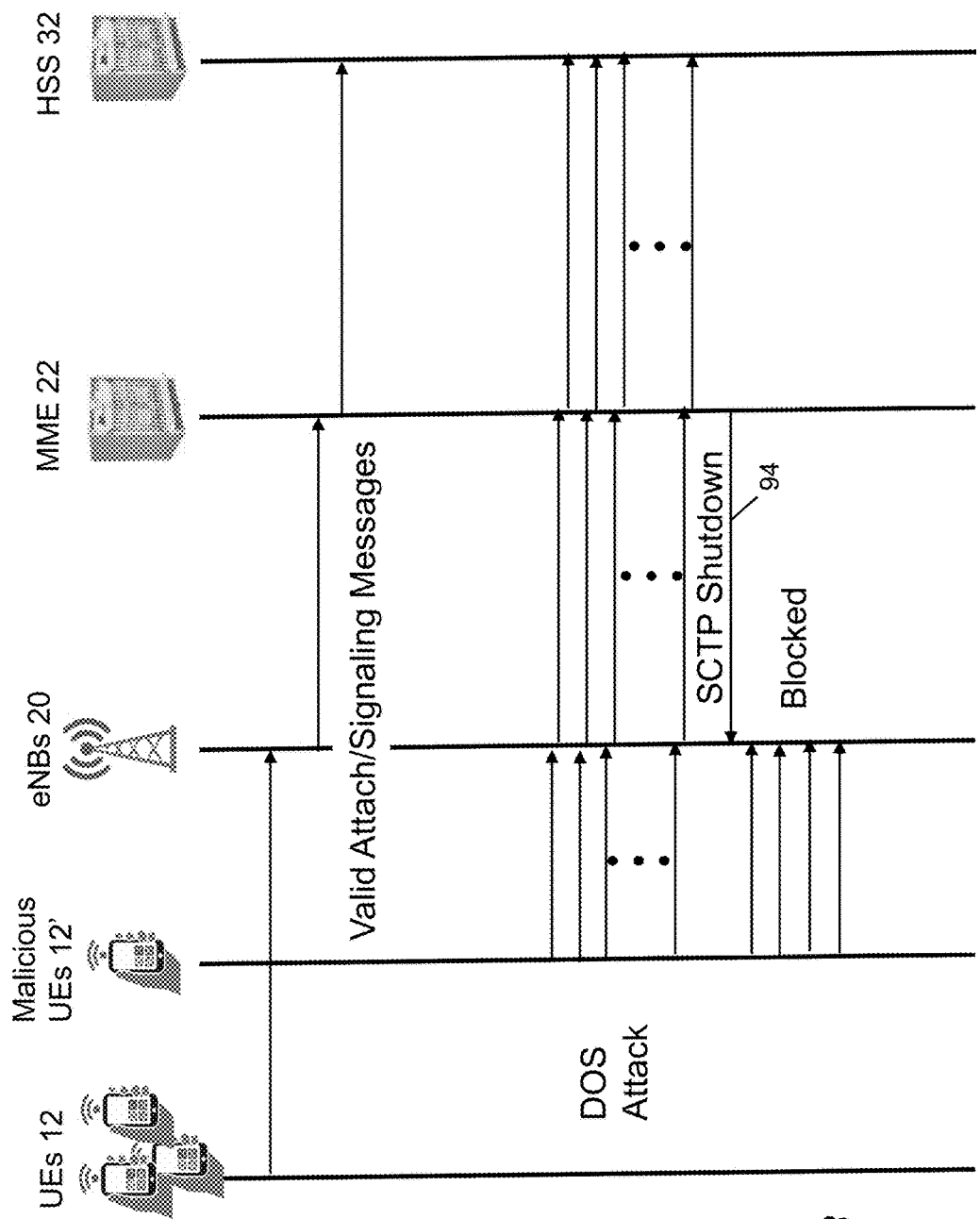
FIG. 8 is a simplified data flow diagram of yet another exemplary Denial of Service (DOS) attack detection and mitigation according to the present disclosure.

FIG. 8 is a simplified data flow diagram of yet another exemplary Denial of Service (DOS) attack detection and mitigation according to the present disclosure. It should be noted that some details and steps in the process have been simplified or omitted for the sake of brevity and clarity. In this example, a Denial of Service attack is launched from one or more malicious UEs 12'. The malicious UEs send the attach request messages to the eNB 20, which passes them on to the MME 22. Since initially the MME does not find the UE identifiers on the blacklist, the MME sends authentication requests to the HSS 32. However, at the HSS, authentication fails, and the HSS sends back messages to indicate authentication errors associated with these requests. The MME 22 adds the UE identifiers to the blacklist and updates the KPI with the failed authentication results. At some point the MME 22 recognizes that the KPI success rate has now fallen below a threshold (predetermined or set by the network operator). As a result, the MME raises an alarm and sends an SCTP Shutdown message to the source eNB 20 (94). In response to receiving the SCTP Shutdown message, the eNB shuts down or ceases operations. This is a drastic step used to mitigate a severe attack situation or when appropriate. Further, the identifier associated with the eNB is added to the eNB blacklist.

It should be noted that the security system and method described herein are applicable to procedures in addition to attach requests, such as service request, TAU attempt, etc.

Figure 10:
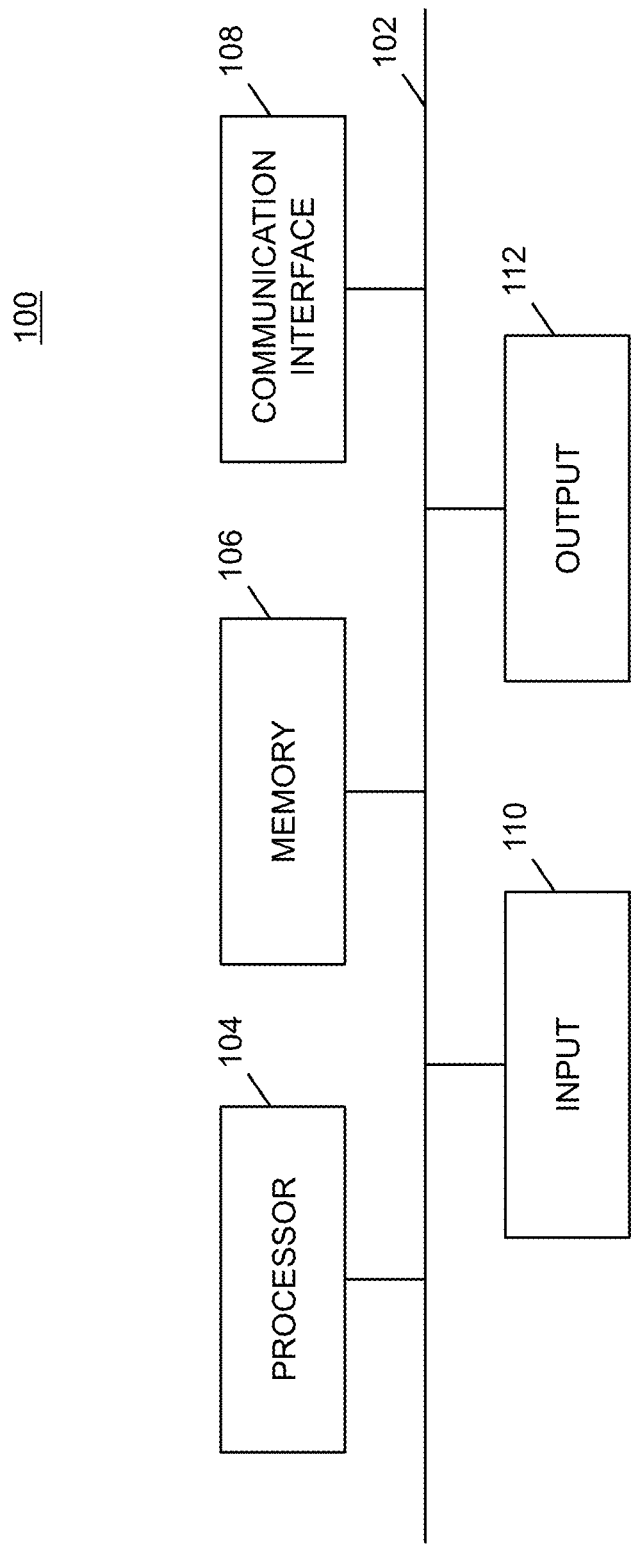
FIG. 10 is a simplified block diagram of an exemplary network node for carrying out methods of MME S1 security according to the present disclosure.

FIG. 10 is a simplified block diagram of an exemplary network node 100 for carrying out the methods of MME S1 security according to the present disclosure. The network node 100 may include a bus 102 interconnecting a processor 104, a memory 106, a communication interface 108, an input device 110, and an output device 112. The bus 102 enables communication among the components of network node 100. The processor 104 may include one or more processing units or microprocessors that interpret and execute coded instructions. In other implementations, the processor 104 may be implemented by or include one or more application-specific integrated circuits (ASICs), field programmable gate arrays (FPGAs), or the like.

The memory 106 may include a random access memory (RAM) or another type of dynamic storage device that stores information and instructions for execution by the processor 104. The memory 106 may also include a read-only memory (ROM) or another type of static storage device that stores static information and instructions for the processor 104. The memory 106 may further include other types of magnetic or optical recording medium and its corresponding drive for storing information and/or instructions. As used herein, the term "memory" is broadly to include registers, buffers, and other data constructs configured to hold data.

The communication interface 108 may include protocol stacks for processing data transmitted via a data protocol now know or to be developed. The communication interface 108 may include transceiver-like devices and antenna that enables the network node 100 to communicate via radio frequency with other devices and/or systems. The communication interface 138 may further include interfaces, ports, or connectors to other devices.

The input 110 may include one or more devices that permit an operator to enter information to the network node 100, such as a keyboard, a keypad, a mouse, a pen, a touch-sensitive pad or screen, a microphone, one or more biometric mechanisms, and the like. The output 112 may include one or more devices that outputs information to the operator, such as a display, a printer port, a speaker, etc.

As described herein, the network node 100 may perform certain operations in response to the processor 104 executing software instructions contained in a computer-readable medium, such as memory 106. A computer-readable medium may be defined as a physical or logical memory device. A logical memory device may include memory space within a single physical memory device or spread across multiple physical memory devices. The software instructions may be read into memory 106 from another computer-readable medium or from another device via a communication interface 108. The software instructions contained in the memory 106 may cause processor 104 to perform processes described herein. Alternatively, hardwired circuitry may be used in place of or in combination with software instructions to implement processes described herein. Thus, implementations described herein are not limited to any specific combination of hardware circuitry and software.

In this disclosure, the term "module" and "node" may be used to refer a physical circuit or collection of hardware components, a logical code module, functionality, and/or a combination of hardware and software entities. Although it is contemplated that the methods described herein reside in the MME, however, it is contemplated that other suitable network node(s) may carry out these methods.

The features of the present invention which are believed to be novel are set forth below with particularity in the appended claims. However, modifications, variations, and changes to the exemplary embodiments described above will be apparent to those skilled in the art, and the security system and method described herein thus encompasses such modifications, variations, and changes and are not limited to the specific embodiments described herein.

| GLOSSARY | |
|---|---|
| 3GPP | Third Generation Partnership Project |
| CDMA | Code Division Multiple Access |
| CN | Core Network |
| CS | Circuit Switched |
| DOS | Denial of Service |
| EIR | Equipment Identity Register |
| eNB | evolved Node B |
| eNodeB | evolved Node B |
| EPC | Evolved Packet Core |
| EPS | Evolved Packet Subsystem |
| E-UTRAN | Evolved UMTS Terrestrial Radio Access Network |
| FDMA | Frequency Division Multiple Access |
| GPRS | General Packet Radio Service |
| GSM | Global System for Mobile Communications |
| GUTI | Globally Unique Temporary Identifier |
| HSS | Home Subscriber Server |
| ICS | IMS Centralized Services |
| IMS | IP-Multimedia Subsystem |
| IMSI | International Mobile Subscriber Identity |
| IP | Internet Protocol |
| ITU | International Telecommunications Union |
| KPI | Key Performance Indicator |
| LTE | Long Term Evolution |
| MME | Mobility Management Entity |
| PDN GW | Packet Data Network Gateway |
| PGW | Packet Data Network Gateway |
| PS | Packet Switched |
| QoS | Quality of Service |
| SCTP | Stream Control Transmission Protocol |
| SGW | Serving Gateway |
| TA | Tracking Area |
| TAI | Tracking Area Identity |
| TDMA | Time Division Multiple Access |
| UE | User Equipment |
| ULA | Update Location Answer |
| ULR | Update Location Request |
| UMTS | Universal Mobile Telecommunication System |
| UTRA | Universal Terrestrial Radio Access |
| UTRAN | Universal Terrestrial Radio Access Network |

What is claimed is:

1. A method for execution in a network node of a telecommunication network comprising:
    storing on a mobility management entity (MME) a blacklist of identifiers of user equipment (UE);
    receiving, from an eNodeB, an attach request of a telecommunication process that originated from a UE, the attach request including an identifier associated with a subscriber of the UE;
    upon receiving the attach request, using the MME to check a UE blacklist to determine whether the identifier is on the UE blacklist;
    in response to the UE identifier being on the UE blacklist:
        rejecting the attach request;

updating an attach success rate metric for the eNodeB to reflect the failed attach request;
comparing the updated attach success rate metric for the eNodeB reflecting the failed attach request to a threshold; and
terminating the telecommunication process, without notifying a home subscriber server (HSS) at any time after the receiving of the attach request from the eNodeB;
in response to the updated attach success rate metric for the eNodeB reflecting the failed attach request falling below the threshold, recognizing a malicious attack and taking mitigating steps; and in response to the UE identifier being absent from the UE blacklist:
requesting for further authentication of the UE identifier;
in response to failed authentication, rejecting the attach request and updating the attach success rate metric for the eNodeB to reflect the failed attach request;
comparing the attach success rate metric for the eNodeB to a threshold; and
in response to a decrease in the attach success rate metric for the eNodeB below the threshold, recognizing a malicious attack and taking mitigating steps.

2. The method of claim 1, wherein taking mitigating steps comprises sending a message to the eNodeB to block one or more of the selected future attach requests.

3. The method of claim 1, wherein the MME comprises an eNodeB blacklist.

4. The method of claim 1, wherein taking mitigating steps comprises sending an overload start message to the eNodeB to block all future non-emergency attach requests.

5. The method of claim 1, wherein taking mitigating steps comprises sending a shutdown message to the eNodeB to block all future attach requests.

6. The method of claim 1, further comprising:
in response to the UE identifier being on the blacklist, tracking a number of attach request failures associated with the UE identifier; and
in response to the number of attach request failures exceeding a UE failure threshold, adding the UE identifier to the UE blacklist.

7. The method of claim 1, further comprising:
receiving, from the eNodeB, a setup request including an identifier associated with the eNodeB;
checking a global list to determine whether the eNodeB identifier is on the global list;
in response to the eNodeB identifier being on the global list, responding with a setup response to the eNodeB; and
in response to the eNodeB identifier being one or more of absent from the global list and on an eNodeB blacklist, responding with a setup failure to the eNodeB.

8. The method of claim 7, wherein responding with a setup failure to the eNodeB further comprises including a Time to Wait information element specifying a time period that the eNodeB must wait before sending another setup request.

9. The method of claim 7, further comprising:
storing the eNodeB blacklist on the MME.

10. The method of claim 9, further comprising maintaining the eNodeB blacklist to include identifiers associated with eNodeBs involved in past malicious attacks.

11. The method of claim 1, further comprising maintaining the UE blacklist to include identifiers associated with stolen UEs and UEs involved in past malicious attacks.

12. The method of claim 9, wherein the MME performs the steps of:
checking the global list; and
checking the eNodeB blacklist.

13. A telecommunication network node comprising:
an S1 interface configured to receive an attach request of a telecommunication process from an eNodeB, the attach request including an identifier associated with a subscriber of the UE;
a memory configured to store a UE blacklist and an attach success rate metric on a per eNodeB basis; and
a processor configured to:
upon receiving the attach request, check the UE blacklist to determine whether the UE identifier in the attach request is on the UE blacklist;
in response to the UE identifier being on the UE blacklist:
reject the attach request;
update a success rate metric for the eNodeB to reflect the failed attach request;
compare the updated attach success rate metric for the eNodeB reflecting the failed attach request to a threshold; and
terminate the telecommunication process, without notifying a home subscriber server (HSS) at any time after the receiving of the attach request from the eNodeB; and
in response to the updated attach success rate metric for the eNodeB reflecting the failed attach request falling below the threshold, recognize a malicious attack and taking mitigating steps; and
in response to the UE identifier being absent from the UE blacklist:
request for further authentication of the UE identifier;
in response to failed authentication, reject the attach request and updating the attach success rate metric on the telecommunication network node on the per eNodeB basis to reflect the failed attach request;
compare the attach success rate metric for the eNodeB to a threshold; and
in response to a decrease in the success rate metric below the threshold, recognize a malicious attack and taking mitigating steps.

14. The network node of claim 13, wherein the processor is further configured to send a message to the eNodeB to block one of all or selected future attach requests.

15. The network node of claim 13, wherein the processor is further configured to send an overload start message to the eNodeB to block all future non-emergency attach requests.

16. The network node of claim 13, wherein the processor is further configured to send a shutdown message to the eNodeB to block all future attach requests.

17. The network node of claim 13, wherein the processor is further configured to:
in response to the UE identifier being on the blacklist, track a number of attach failures associated with the UE identifier; and
in response to the number of attach failures exceeding a UE failure threshold, add the UE identifier to the UE blacklist.

18. The network node of claim 13, wherein the processor is further configured to:
receive, from the eNodeB, a setup request including an identifier associated with the eNodeB;
check a global list to determine whether the eNodeB identifier is on the global list;

in response to the eNodeB identifier being on the global list, respond with a setup response to the eNodeB; and
in response to the eNodeB identifier being one or more of absent from the global list and on an eNodeB blacklist, respond with a setup failure to the eNodeB.

19. The network node of claim 18, wherein the processor is further configured to send a setup failure including a Time to Wait information element specifying a time period that the eNodeB must wait before sending another setup request.

20. The network node of claim 18, wherein the memory is further configured to store the eNodeB blacklist.

21. The network node of claim 18, wherein the memory is further configured to maintain the eNodeB blacklist to include identifiers associated with eNodeBs involved in past malicious attacks.

22. The network node of claim 13, wherein the processor is configured to request for further authentication of the UE identifier by the Home Subscriber Server (HSS) via an S6a interface.

23. A security method for execution in a Mobility Management Entity (MME) node of a telecommunication network to detect malicious attacks, comprising:
storing on the MME a UE blacklist of identifiers of user equipment (UE);
receiving, from an eNodeB, an attach request of a telecommunication process that originated from a UE, the attach request including an identifier associated with a subscriber of the UE;
checking the UE blacklist to determine whether the identifier in the attach request is on the UE blacklist;
in response to the UE identifier being on the UE blacklist.
rejecting the attach request;
sending an attach reject message back to the eNodeB;
terminating the telecommunication process, without notifying a home subscriber server (HSS) at any time after the receiving of the attach request from the eNodeB;
updating an attach success rate metric for the eNodeB to reflect the failed attach request; and
in response to the updated attach success rate metric for the eNodeB reflecting the failed attached request falling below a threshold, recognizing a malicious attack and taking mitigating steps.

24. The security method of claim 23, further comprising:
in response to the UE identifier being absent from the UE blacklist:
requesting for further authentication of the UE identifier;
in response to failed authentication, rejecting the attach request and updating the success rate metric to reflect the failed attach request;
comparing the attach success rate metric for the eNodeB to a threshold; and
in response to a significant decrease in the attach success rate metric for the eNodeB, recognizing a malicious attack and taking mitigating steps.

25. The security method of claim 23, further comprising:
in response to the UE identifier being absent from the UE blacklist:
requesting further authentication of the UE identifier;
in response to failed authentication, rejecting the attach request and updating the attach success rate metric for the eNodeB to reflect the failed attach request;
comparing the attach success rate metric for the eNodeB to a threshold; and
in response to a significant decrease in the success rate metric, recognizing a malicious attack and taking mitigating steps.

26. The security method of claim 23, wherein taking mitigating steps comprises sending a message to the eNodeB to block one or more of the selected future attach requests.

27. The security method of claim 23, wherein taking mitigating steps comprises sending an overload start message to the eNodeB to block all future non-emergency attach requests.

28. The security method of claim 23, wherein taking mitigating steps comprises sending a shutdown message to the eNodeB to block all future attach requests.

29. The security method of claim 23, further comprising:
in response to the UE identifier being on the blacklist, tracking a number of attach request failures associated with the UE identifier; and
in response to the number of attach request failures exceeding a UE failure threshold, adding the UE identifier to the UE blacklist.

30. The security method of claim 23, further comprising:
receiving, from the eNodeB, a setup request including an identifier associated with the eNodeB;
checking a global list o determine whether the eNodeB identifier is on the global list;
checking an eNodeB blacklist to determine whether the eNodeB identifier is on the eNodeB blacklist;
in response to the eNodeB identifier being on the global list and not on the eNodeB blacklist, responding with a setup response to the eNodeB; and
in response to the eNodeB identifier being one or more of absent from the global list and not the eNodeB blacklist, responding with a setup failure to the eNodeB.

31. The security method of claim 30, wherein responding with a setup failure to the eNodeB further comprises including a Time to Wait information element specifying a time period that the eNodeB must wait before sending another setup request.

32. The security method of claim 30, further comprising: maintaining the eNodeB blacklist on the MME node.

33. The security method of claim 32, further comprising maintaining the eNodeB blacklist to include identifiers associated with eNodeBs involved in past malicious attacks.

34. The security method of claim 23, further comprising maintaining the UE blacklist to include identifiers associated with stolen UEs and UEs involved in past malicious attacks.

35. The security method of claim 23, further comprising comparing the attach success rate metric for the eNodeB to at least one of an absolute threshold or a relative threshold to recognize a significant decrease in the attach success rate metric.

* * * * *